United States Patent [19]

Olashaw

[11] 4,347,015
[45] Aug. 31, 1982

[54] STRUCTURAL FRAME CORNER ASSEMBLY FOR ELECTRICAL SWITCHBOARDS AND THE LIKE

[75] Inventor: William F. Olashaw, Plainville, Conn.

[73] Assignee: General Electric Company, New York, N.Y.

[21] Appl. No.: 203,201

[22] Filed: Nov. 3, 1980

[51] Int. Cl.³ .............................................. F16D 1/00
[52] U.S. Cl. .................................. 403/219; 403/171; 403/231; 403/393; 403/176
[58] Field of Search ............... 403/217, 219, 171, 172, 403/176, 231, 393, 399, 397

[56] References Cited

U.S. PATENT DOCUMENTS

| | | | |
|---|---|---|---|
| 2,990,920 | 7/1961 | Hoffman | 403/219 X |
| 3,102,616 | 9/1963 | Simpkins | 403/176 |
| 3,117,656 | 1/1964 | Kinnear | 403/219 |
| 3,265,419 | 8/1966 | Durnbaugh et al. | 403/219 |
| 3,353,854 | 11/1967 | Hansen | 403/171 |
| 4,068,966 | 1/1978 | Johnson et al. | 403/397 |
| 4,078,847 | 3/1978 | Presnick | 403/171 X |
| 4,093,167 | 6/1978 | Rooklyn | 403/231 X |
| 4,278,361 | 7/1981 | Steinke | 403/231 X |

FOREIGN PATENT DOCUMENTS 72053  2/1976  Australia .............................. 403/231

*Primary Examiner*—Wayne L. Shedd
*Attorney, Agent, or Firm*—Richard A. Menelly; Walter C. Bernkopf; Fred Jacob

[57] ABSTRACT

Elongated width, depth and vertical posts of a structural metal frame are joined in mutually perpendicular relationship at the frame corners by a gusset sub-assembly consisting of a right angle brace reinforced by a gusset plate. The posts are each of C-shaped cross-section to provide a coextensive slot flanked by flanges having preformed therein corresponding hole patterns utilized by self-tapping screws to secure the gusset sub-assembly thereto. Integral fingers bent back from the terminations of the brace penetrate the slots to resiliently engage the width and depth posts and impart tension to the corner assembly joint.

8 Claims, 4 Drawing Figures

STRUCTURAL FRAME CORNER ASSEMBLY FOR ELECTRICAL SWITCHBOARDS AND THE LIKE

BACKGROUND OF THE INVENTION

The present invention generally relates to structural framework assemblies and more specifically to a frame corner assembly having particular, but not necessarily limited application to frames for large electrical enclosures such as switchboards and the like.

Enclosure frames for supporting substantial weight as encountered in large electrical switchboards are typically created from an assembly of elongated slender metal struts or posts converging from three directions to frame corners where they are joined in mutually perpendicular relationship. In order to provide a strong, rigid frame assembly, the posts are often welded together at the frame corners. While welding produces a satisfactory corner joint, the posts cannot be prepainted. Moreover, welding is relatively time consuming and expensive since jigs or fixtures to hold the posts in alignment and relatively skilled labor are required to assemble the frame.

An alternative and more popular assembly procedure is to construct the frame members or posts such that they can be joined by suitable fasteners, such as bolts, screws or rivets. U.S. Pat. Nos. 3,305,225, 3,353,854 and 3,357,727 disclose frame corner assemblies representative of this approach.

An object of the present invention is to provide an improved structural frame corner assembly.

Another object is to provide a frame corner assembly which accommodates plural frame members of uniform cross-sectional size and shape.

Yet another object is to provide a corner assembly of the above character which is capable of achieving a strong, rigid, corner joint in residual tension.

An additional object is to provide a corner assembly of the above character which is efficient in construction and convenient to assemble using relatively unskilled labor.

Other objects of the invention will in part be obvious and in part appear hereinafter.

SUMMARY OF THE INVENTION

In accordance with the present invention, there is provided an improved structural corner assembly for joining elongated members of a frame utilized in a cubical enclosure such as an electrical switchboard. The elongated frame members include width, depth and vertical posts, each of C-shaped cross-section to provide a coextensive slot flanked by flanges having preformed, corresponding hole patterns therein. These three posts are joined in mutually perpendiculary relationship at each of the frame corners by a gusset sub-assembly consisting of a right angle brace and a reinforcing gusset plate using self-tapping screws threaded into the holes in the post flanges.

To create a desirable degree of tensioning of the frame corner joints, integral fingers bent back from the terminations of the brace penetrate the slots to resiliently engage the width and depth posts as the screws are screwed tight. These fingers additionally serve to align the gusset sub-assemblies with the posts and thereby facilitate assembly of the corner joints.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings, in which:

DESCRIPTION OF THE DRAWINGS

Corresponding reference numerals refer to like parts throughout the several views of the drawings.

DETAILED DESCRIPTION

Figure 1:
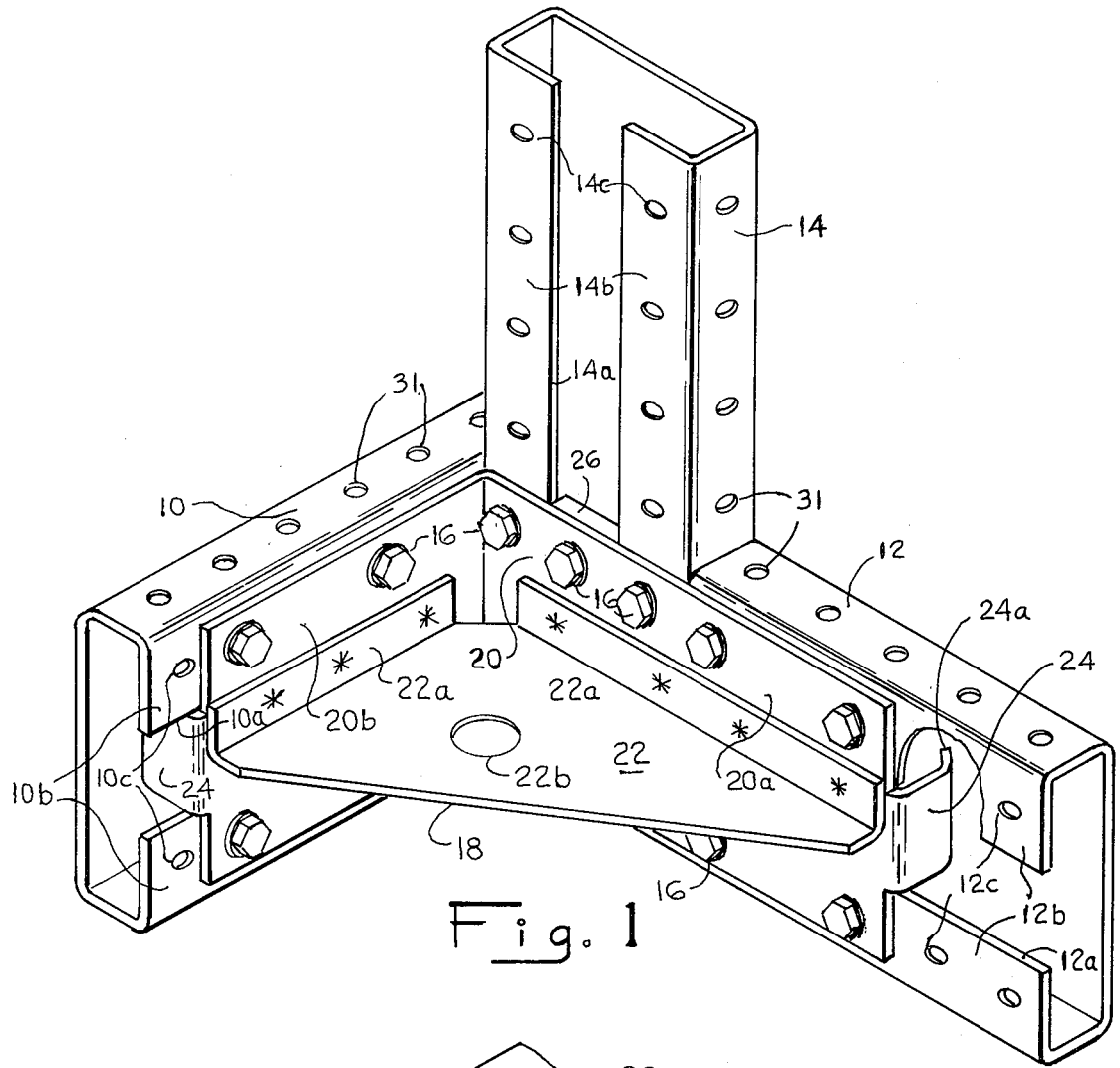
FIG. 1 is a perspective view of a structural frame corner assembly constructed in accordance with the present invention.
Figure 2:
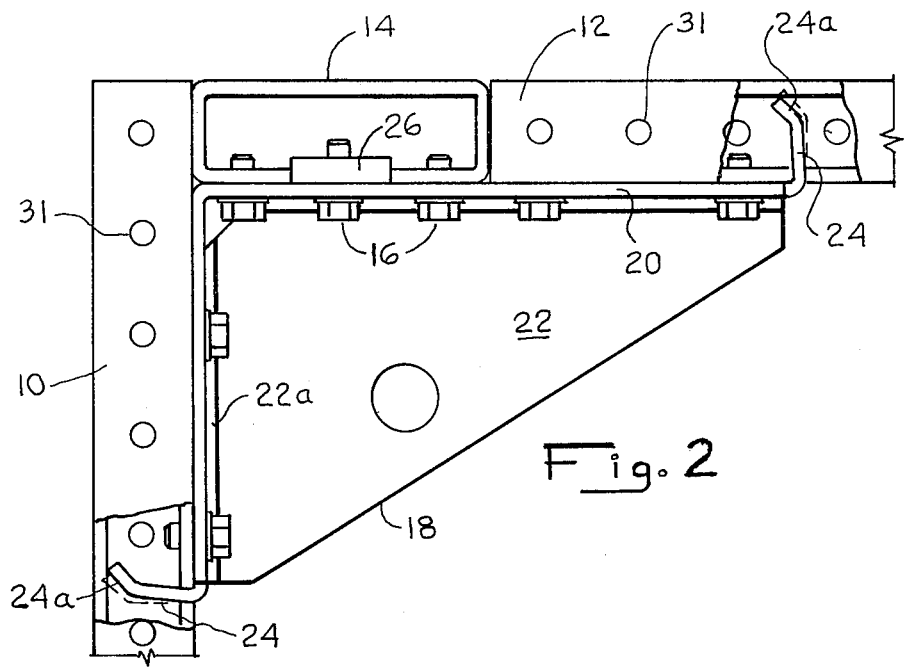
FIG. 2 is a plan view partially broken away of the corner assembly of FIG. 1.
Figure 3:
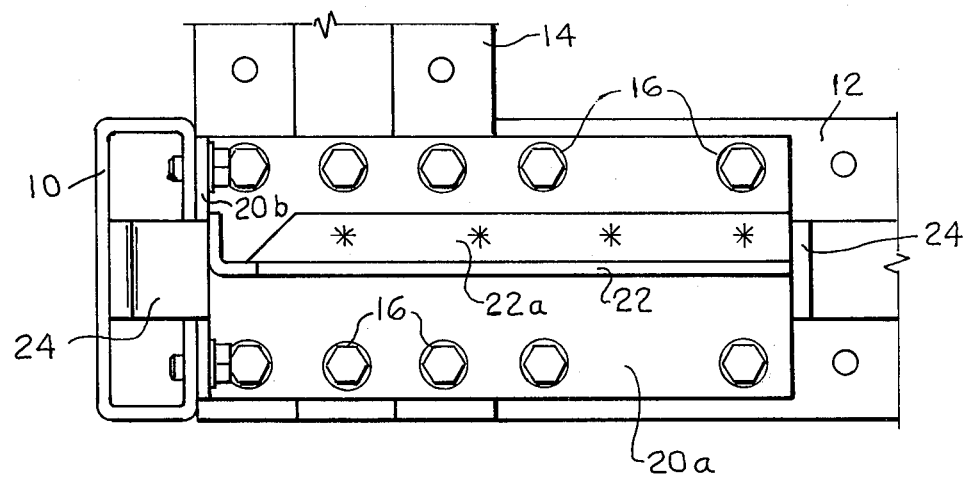
FIG. 3 is a side elevational view of the corner assembly of FIG. 2.

Referring jointly to FIGS. 1 through 3, the structural frame corner assembly of the present invention provides for the joining of three frame members or posts in mutually perpendicular relationship to create strong, rigid corner joints pursuant to the assembly of a frame having particular application in large electrical enclosures, such as switchboards and the like. Thus, as best seen in FIG. 1, the three frame posts consist of a width post 10, a depth post 12, and a vertical post 14. As an important feature of the invention, these posts are formed having the same cross-sectional shape and dimensions. Specifically, these posts are C-shaped in cross-section to provide coextensive slots 10a, 12a and 14a respectively flanked by flanges 10b, 12b and 14b in which are preformed corresponding hole patterns 10c, 12c and 14c distributed along the post lengths. As seen in the drawings, these holes are utilized by self-tapping screws 16 to clamp a gusset sub-assembly, generally indicated at 18, to the terminal portions of the three posts, thereby to effect a corner joint securing the posts in mutually perpendicular relationship. It will be appreciated that since, for a particular frame size, the three posts typically differ only as to their lengths, manufacturing, stocking and assembly procedures are all considerably simplified.

As seen in FIGS. 1 through 3, the gusset subassembly consists of a right angle brace 20, preferably with its leg 20a longer than its leg 20b, and a reinforcing, right-triangular shaped gusset plate 22. The right angle edge portions 22a of this plate are bent out to facilitate spot welding of the gusset plate to the brace legs. Vertically spaced patterns of clearance holes preformed in legs 20a, 20b of the brace accommodate the corner joint-making screws 16. A hole 22b may be provided in gusset plate 22 to facilitate the bolting down of the assembled frame should it be deemed necessary.

It will be noted that in the illustrated corner assembly, the terminal portion of vertical post 14 is disposed intermediate the butt end of depth post 12 and the inner end portion of width post 10. By virtue of this arrangement, the vertical posts may be extended beyond the lower frame corners to serve as standoff support legs and beyond the upper frame corners to provide lifting struts. Moreover, since the width posts are positioned beyond the sides of the vertical posts, enclosure doors may be mounted to the vertical posts in flush relation with the outer surfaces of the width posts to provide an aesthetically pleasing enclosure appearance.

As an additional feature of the present invention, fingers 24, integrally formed with the terminations of the brace legs 20a, 20b, are bent out such as to project into slots 10a and 12a of width post 10 and depth post 12, respectively, when gusset sub-assembly 18 is applied to the corner joint. These fingers, being of the same width as the slots, serve to align the parts prior to their assembly by screws 16. As an additional alignment expedient, a metal pad 26 is preassemblied to brace leg 20a by several of the screws 16 in a position to closely fit into slot 14a of vertical post 14 during assembly.

An additional function served by fingers 24 is to impart a degree of tension to the corner joint when screws 16 are tightened down. This is achieved by making the length of these fingers somewhat greater than the depth of the post slots. Moreover, the terminations of the fingers are slightly bent over, as indicated at 24a. Thus, when screws 16 are tightened, the finger terminations engage the inner surfaces of posts 10 and 12, causing the fingers to flex, as indicated in phantom in FIG. 2. Due to the inherent resiliency of the brace metal stock, the fingers serve to tension the corner joint and thus discourage subsequent loosening of screws 16.

Figure 4:
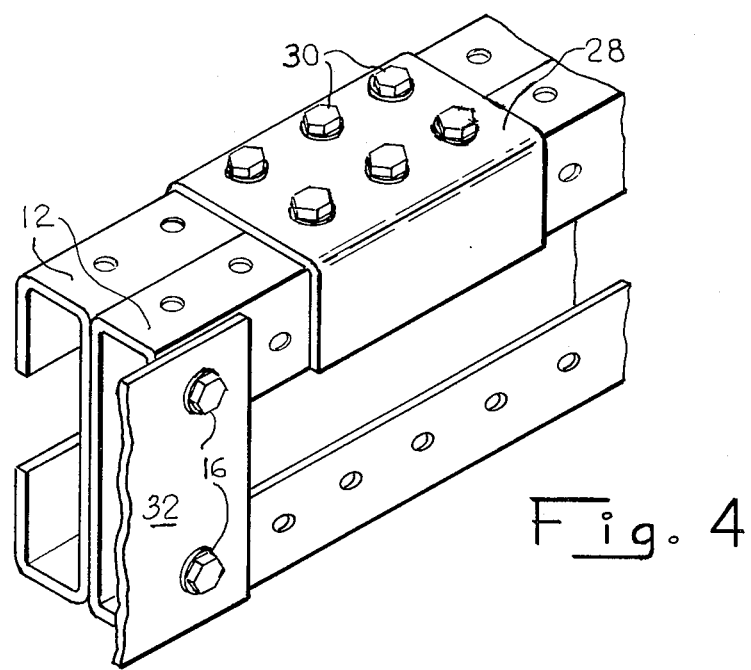
FIG. 4 is a fragmentary perspective view depicting the joining together of adjacent structural frames and the boxing of the C-shaped frame posts for increased strength.

FIG. 4 illustrates several other advantages offered by the structural configuration of the frame posts 10, 12 and 14. In their application to electrical switchboard enclosures, these posts are joined by the corner joints of FIG. 1 to create a separate cubical frame for each switchboard vertical section. These frames are then united in side-by-side relation using a series of U-shaped metal clips, one seen at 28 in FIG. 4, embracing corresponding vertical and depth posts and secured in place by self-tapping screws 30 utilizing holes 31 preformed in the narrow sides of the posts. These holes are also used to advantage in securing top, bottom and side panels (not shown) in place. Also, to strengthen the posts, their C-shaped cross-section is boxed off by plates 32 secured to the post flanges by screws 16.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A structural frame corner assembly for enclosures such as electrical switchboards and the like, said assembly comprising, in combination:
   A. an elongated width post, an elongated depth post and an elongated vertical post arranged in mutually perpendicular relationship with a terminal portion of said vertical post disposed in intermediate, abutting relation with terminal portions of said width and depth posts at a corner of the enclosure frame,
      (1) each of said posts being C-shaped in cross-section to provide a coextensive slot flanked by flanges having corresponding patterns of holes preformed therein;
   B. a sheet metal gusset sub-assembly including
      (1) a brace integrally formed having a pair of elongated legs arranged at a right angle;
      (2) vertically spaced patterns of preformed holes distributed along the lengths of said legs;
      (3) a triangular gusset plate affixed to said legs to reinforce their right angular relationship; and
      (4) a finger integrally formed with the free end of each said leg and bent back in directions away from said gusset plate, the lengths of said fingers being slightly in excess of the depth of said post slots; and
   C. self-threading screws utilizing said preformed holes in said post flanges and said brace legs to assemble said gusset sub-assembly to said width, depth and vertical posts and thus rigidly preserve their mutually perpendicular relationship, said fingers resiliently engaging said width and depth posts through said slots therein to tension said assembly.

2. The structural frame corner assembly defined in claim 1, wherein said posts are of uniform cross-sectional size.

3. The structural frame corner assembly defined in claim 2, wherein said fingers are formed having a width substantially equal to the width of said post slots.

4. The structural frame corner assembly defined in claim 3, wherein said vertical post is arranged such that it is abutted on one side by the butt end of said depth post and on the other side by the terminal portions of said width post flanges.

5. The structural frame corner assembly defined in claim 4, wherein said leg of said brace secured by said screws to said vertical and depth posts is elongated relative to the other of said brace legs secured by said screws to said width post.

6. The structural frame corner assembly defined in claim 5, which further includes an alignment pad preassembled to said elongated brace leg for close-fitting acceptance in said vertical post slot.

7. The structural frame corner assembly defined in claim 1 in combination with U-shaped metal clips secured in embracing relation with corresponding said depth and vertical posts of separate structural frames pursuant to uniting said separate frames in side-by-side relation.

8. The structural frame corner assembly defined in claim 1 in combination with elongated metal plates screwed to said posts utilizing said holes in said flanges thereof to box off the C-shaped post cross-sections and thus strengthen said posts.

* * * * *